US006902286B2

(12) United States Patent
Hunter

(10) Patent No.: US 6,902,286 B2
(45) Date of Patent: Jun. 7, 2005

(54) LIGHTING SYSTEM UTILIZING A DISPLAY SCREEN FOR ILLUMINATING A PREDEFINED AREA IN FRONT OF SAID DISPLAY SCREEN

(75) Inventor: Charles Hunter, Williamsburg, VA (US)

(73) Assignee: Burns Doane Swecker & Mathis LLP, Alexandra, VA (US)

( * ) Notice: Subject to any disclaimer, the term of this patent is extended or adjusted under 35 U.S.C. 154(b) by 7 days.

(21) Appl. No.: 10/276,806

(22) PCT Filed: May 21, 2001

(86) PCT No.: PCT/US01/16347

§ 371 (c)(1),
(2), (4) Date: Nov. 19, 2002

(87) PCT Pub. No.: WO02/17683

PCT Pub. Date: Feb. 28, 2002

(65) Prior Publication Data

US 2003/0227771 A1 Dec. 11, 2003

Related U.S. Application Data

(60) Provisional application No. 60/205,498, filed on May 19, 2000.

(51) Int. Cl.$^7$ .............................................. F21V 33/00
(52) U.S. Cl. ............................. 362/85; 362/26; 362/109
(58) Field of Search ............................. 362/85, 23, 26, 362/109, 30, 168, 559

(56) References Cited

U.S. PATENT DOCUMENTS 6,145,992 A * 11/2000 Wattenburg .................. 362/85

* cited by examiner

*Primary Examiner*—Sandra O'Shea
*Assistant Examiner*—Guiyoung Lee
(74) *Attorney, Agent, or Firm*—Burns, Doane, Swecker & Mathis, L.L.P.

(57) ABSTRACT

A lighting system includes a lens element which redirects light emitted from a display screen onto a keypad, keyboard or a control pad placed in front of or adjacent to the display screen such that without disturbing the display of other information on the display screen, the light emitted by the display screen illuminates the keypad, keyboard or control panel without the need for auxiliary light sources or auxiliary power sources. A simple program or program modification controls the display screen to provide appropriate light to the lens element.

20 Claims, 1 Drawing Sheet

LIGHTING SYSTEM UTILIZING A DISPLAY SCREEN FOR ILLUMINATING A PREDEFINED AREA IN FRONT OF SAID DISPLAY SCREEN

This application claims the benefit of Provisional Application Ser. No. 60/205,498, filed May 17, 2000.

FIELD OF THE INVENTION

The present invention relates to a lighting system, and more particularly to a lighting system which redirects light emitted from a display screen to a predefined area, such as a keypad, keyboard or control panel in front of a display screen.

BACKGROUND OF THE INVENTION

There are many occasions were the keyboard of a computer system or control panel having a display is obscured in darkness. For instance, when operating a laptop on an airplane, the lighting of the airplane is often inadequate to clearly see the keyboard of the laptop. Similarly, when giving a presentation the lecturer is often shrouded in darkness to improve the audience's ability to view projected images or other props of the lecture. Other situations include operating a laptop in an automobile in a darkened environment, a podium control panel or many other instances where the keypad, keyboard or control panel is obscured in darkness relative to the display screen and the operator's environment. This is particularly so since the display screen tends to be emit light much brighter than the ambient light incident upon the keypad, keyboard or control panel.

Heretofore, solutions have generally involved simply placing an auxiliary light fixture to project auxiliary light onto the keypad. The auxiliary light fixture can be as simple as the lamp, desk lamp, spot light or the like. The problem with these types of supplemental lighting devices is that they require power. For instance, a lamp needs to be plugged into a wall socket or another source of electricity. Even in embodiments where the auxiliary light source is powered by a battery, additional conveniences occur with the maintenance, charging and replacement of said batteries.

There is, therefore, a need for a supplemental lighting source for a keypad, keyboard or a control panel which does not involve additional wires, batteries or other auxiliary power sources.

Additionally, there is always a need for new venues for advertisements. Advertisements not only function to inform the public of the availability of certain product or services and the existence of various companies, but advertising often offsets or otherwise reduces the cost of goods because the advertiser is willing to supplement the manufacture, distribution and advertisement of items in order to place their advertisements in front of the consumer.

SUMMARY OF THE INVENTION

The present invention solves these and other problems of the prior art utilizing a simple design which does not involve auxiliary power sources, or the consumption of additional power in most embodiments. It also provides a convenient advertising venue for displaying indicia such as trademarks, company or individual names, and other forms of advertisement in front of the consumer in an area the advertiser knows the consumer will be continue observing during the user's interaction with the display device, e.g., computes.

These and other objects of the invention are achieved by a lighting system which includes a lens element and a display screen. The lens element simply attaches to a portion of the display screen such that light emitted from the display screen is redirected onto the keypad, keyboard or control panel. The lens element includes an external light receiving surface, an internal light redirecting element, and a light emitting surface. At least one of the internal light redirecting element and the light emitting surface redirect the light emitted from the light emitting surface to project onto a predetermined area at a predetermined distance, e.g., the predefined area being the keypad, keyboard or control panel in front of the display screen. The display screen emits light and includes a first area of the screen designated not to emit light into the external light receiving surface of the lens element. This first area of the screen is meant to display what is normally displayed on the display screen, such as text, images or graphics. A second area of the display screen is designated to emit light into the external light receiving surface of the lens element. This light is ultimately redirected onto the predefined area, such as the keyboard, keypad, or a control panel.

The external light receiving service is adhered to or integral with the display screen.

BRIEF DESCRIPTION OF THE DRAWINGS

These and other aspects of the invention will now be described with reference to various exemplary embodiments, to which the invention is not limited, as shown in the accompanying drawings, in which.

DETAILED DESCRIPTION OF PREFERRED EMBODIMENTS

Figure 1:
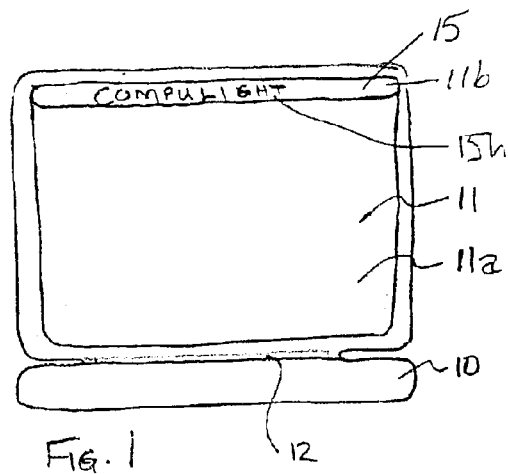
FIG. 1 is a front view of a computer, e.g., a laptop, illustrating one preferred position of the lens element.
Figure 2:
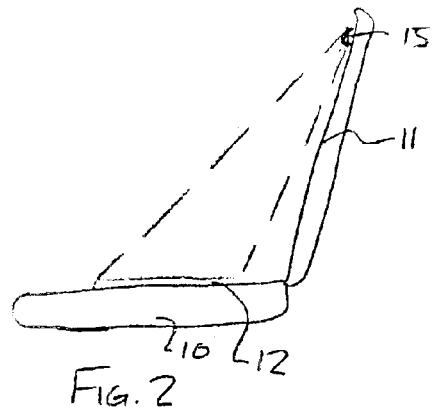
FIG. 2 is a side view of the computer shown in FIG. 1.

The exemplary embodiment shown in FIG. 1 includes a computer 10, in this instance a laptop, with the display screen 11 and a keypad 12 each of which does not need to be modified from a conventional configuration to adopt the present invention. The invention can be applied, for instance, to anything in which lighting in front of adjacent to the display is desirable, such as PDA's handheld computers, laptop computers, presentation devices, notebooks, sub-notebooks, remote teleprompter presentation screen-key boards, pagers, alphanumeric pagers/organizers, desk top computers, audio and/or video devices, facsimile machines, TVs, video games, airplane entertainment consoles, keyboards, etc. In fact, one of the attributes of the present invention is that it can be applied to preexisting computers by adhesion of the lens element 15 onto the display screen and a simple modification of the operating system or other, higher level program to create an appropriate light source for the lens element using the light emissions of the display screen.

As shown in FIGS. 2–7, the lens element 15 includes an external light receiving surface 15a, and internal light redirecting element 15b, and a light emitting surface 15c. Either the internal light redirecting element 15b or the light emitting surface 15c controls light emitted from the light emitting surface to project on to a predefined area at a predefined distance (e.g., keyboard 12) with predetermined light intensity.

A display screen 11 emits light in a first area 11a and a second area 11b. The first area 11a is designated to not emit light into the external light receiving surface 15a of a lens element 15. The first area 11a, it generally is designed to display what is normally intended to be displayed on the display screen 11. The first area 11a is generally the majority of the display screen 11, with the second area 11b forms a strip at the top, or perhaps the bottom of the display screen 11 to be as unintrusive as possible to the user. The second area 11b of the display screen 11 has a profile, generally flat for liquid crystal displays and generally somewhat curved for cathode ray tube-type display screens. The external light receiving surface 15a of the lens element 15 is designed to match the surface profile of the second area 11b of the display screen 11 either by being flexible, semi-flexible or by being molded to shape as a rigid or semi-rigid form.

External light receiving surface may include a mask 15d (shown in FIG. 3) to control light entering the lens element 15. If the lens element 15 is sold as an after market product, i.e., a product sold separate from the display screens 11, it may be desirable for the user to tailor the light profiled to suit the particular keypad, keyboard or operating panel 12 that is to be employed in front of the display screen 11. Such a post-market product could include a blank mask 15d to be custom cut by the user, or several different masks 15d which define an area of light projection matching the most popular keypads, keyboards or control panels 12. A similar mask 15e can additionally or alternatively be provided on the light emitting surface 15c of the lens element 15 since it may be easier for a user to apply the lens element 15 to the display screen 11 and then experiment to determine which mask 15d is appropriate for his or her keypad, control panel or keyboard 12. Alternatively, the function of the mask 15d or 15e can be accoplished by the software program controlling the display screen. The lens element 15 is adhered to the display screen 11 using an adhesive, and preferably a non-permanent adhesive. Alternatively it can be integrally molded with the display screen 11.

The lens element 15 can take anyone of several different configurations. The basic characteristics of the lens element is that it redirects light in controlled fashion from the display screen 11 onto a predefined area at a predetermined distance from the display screen (e.g. keypad 12). Generally this would involve a negative lens element such that the light emitted from second area 11b of the display screen 11 is spread over a larger area than the surface area of the second area 11b of the display screen 11.

Figure 3:
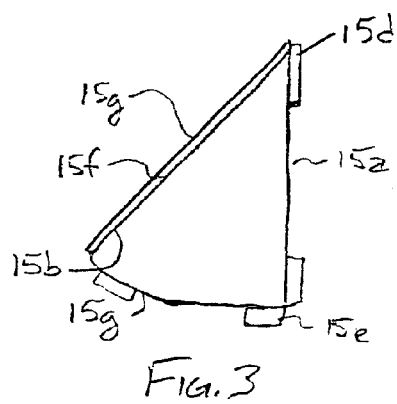
FIG. 3 is a cross sectional view of the first embodiment of a lens element.
Figure 4:
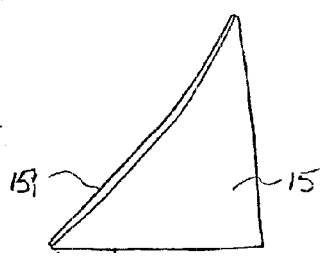
FIG. 4 is a cross sectional view of a second embodiment of a lens element.

For instance, as illustrated in FIG. 3 the internal light redirecting element 15b can include a reflective surface 15f for reflecting light internal to the lens element 15 and received from the external light receiving surface 15a for redirection to the light emitting surface 15c. The reflective surface 15f can be in the form of reflective tape applied to the external surface of the lens element 15, or reflective material such as aluminum or other reflective material sputtered or otherwise deposited onto the lens element 15. The manner of forming the reflective surface is not essential to the present invention.

The internal light redirecting element 15b can include a light emitting surface area 15g for emitting some of the internal light through the surface. For instance, the light emitting surface area 15g of the internal light redirecting element 15b can be in the form of a half mirrored surface. The mirrored surface can be in the form of indicia 15h (FIG. 1), such as an advertisement, a name or trademark of an entity such as a company or an individual. Hence, as the user observes the display screen 11, an illuminated advertisement, name or trademark 15h appears immediately adjacent to the first area 11a of the display screen 11. This provides a great deal of exposure for the advertisement.

An alternative embodiment to the half mirror surface being in the form of indicia 15h is that the entire external surface of the light redirecting element 15b of the lens element 15 is in the form of a half mirror. In this instance, the computer can be operated such that the second area 11b of the display screen 11 displays a message. Such a message can be a dynamic message, such scrolling text or other form of banner advertisement. This offers optical diversity to the user, which would tend to attract more attention of the user.

As shown in FIG. 3, the light redirecting element 15b is a flat mirrored or half-mirrored surface 15f and the light emitting surface 15c is in the form of a convex lens.

Figure 5:
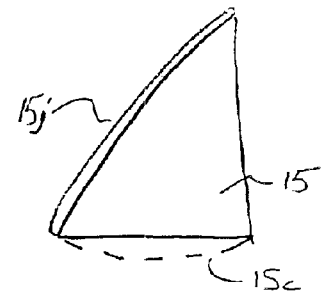
FIG. 5 is a cross sectional view of a third embodiment of a lens element.

The reflective surface of the light redirecting element 15b can be a concave surface 15i such as shown in FIG. 5. This concave surface has the effect of dispersing light emitted from the second area 11b of the display screen 11 via the light emitting surface 15c of the lens element 15 into the predetermined area.

Alternatively, such as shown in FIG. 5 the light reflective surface of the light redirecting element can have a convex surface 15j. A convex surface 15j is used in an embodiment in which the height of the light emitting surface 15c of the lens element 15 is desired to be minimized or light is to be projected on a plane close to parallel to the display screen 11 as shown in FIG. 5. In such an embodiment, it would be appropriate for the light emitting surface 15c to have a convex surface such that the light redirected by the convex reflective surface 15j is diffused over the predetermined area.

Figure 6:
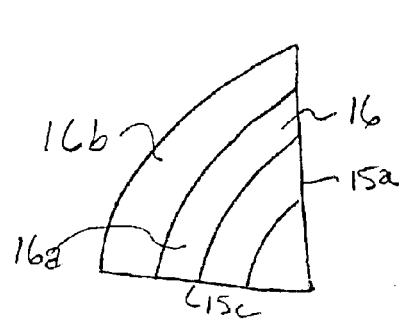
FIG. 6 is a cross sectional view of a fourth embodiment of a lens element in accordance with the present invention.
Figure 7:
FIG. 7 is a cross sectional view of a fifth embodiment of the lens element in accordance with the present invention.

In yet another alternative embodiment of the lens element 15, as shown in FIG. 6, the lens element can include one or more light guides to 16 for redirecting light internal to said lens element 15 received from the external light receiving surface 15a to the light emitting surface 15c of the lens element 15. Such a light guide embodiment as shown in FIG. 6 can include a first light guide area 16a for guiding some of the light internal to the lens element 15 from the external light receiving surface 15a to the light emitting surface 15c, and second light guide area 16b for emitting some of the internal light substantially perpendicular to the surface of the second area 11b of the display screen 11. This can be accomplished by simply removing some of the cladding on the light guide to form indicia such as an advertisement, name or trademark of the company 15h. Alternatively, the light guide 16 can be leaky to mimic a half mirror, and indicia placed on the display screen 11 such that when it is projected into the second light guide area 16b indicia is visible to the user.

With respect to light emitting service 15c, the light emitting surface 15c can be a flat surface, or a convex surface. It is possible for the light emitting surface 15c to be a concave area if a small portion of the control keypad or keyboard is to be illuminated.

With respect to the computer 10, the computer 10 has a function of defining the first area 11a on the display screen 11 designated not to emit light into the external light receiving surface 15a of the lens element and a second area 11b of the display screen being designated to emit light into the external light receiving surface of a lens element. This function can take the form of a software modification to the operating system screen layout. For instance, the adjustment to the operating system screen layout might leave a fraction of an inch of area or strip across the top edge of the display screen 11 such that when the lens element 15 is attached to the screen it will cover only the second area 11b of the display screen. Alternatively or additionally, manufactures of the display screen and incorporation with the operating system screen layout developers can design display screens that are of the same aspect ratio as current display screens, but include an additional area for placement of the lens element 15.

Additionally, a computer 10 can emit a predefined spectrum of light in the second area 11b of the display screen 11. For instance, white light of a broad spectrum can be emitted to provide white light onto the keypad. Alternatively, various colors of light can be used to the advantage of the user or even designated by the user by controlling the operating screen layout software through normal user interfaces. Further still, the defined spectrum of light can interact with the ink or paint used on the indicia of the keypad such that the indicia is illuminated through a phosphor reaction or black light type illuminator. It is even possible for the manufacturers of the display devices to dope or otherwise modify the phosphors to create a neat spectrum that would facilitate illumination of the keypad indicia to the user.

The operating system screen layout can also be modified such that the light emitted in the second area 11b of the display screen 11 has a greater intensity than the light emitted in the first area 11a of the display screen 11. In this manner, the keypad 12 can be illuminated using a relatively small portion of the display screen's emitted light by maintaining a greater balance of illumination between the display screen and the illuminated keypad. This may result in greater power consumption, but it is also possible that the first area 11a of the display screen 11b sufficiently dimmed to make up for the greater power consumption imposed for generating additional light in the second area 11b of the display screen 11.

It should be noted that various modifications and variations of the invention will occur to those skilled in the art without departing from the scope of the invention as defined in the claims appended hereto. For instance, the exemplary embodiment the operating system screen layout is modified to create the second area 11b of the display screen 11. Alternatively, or additionally, various high level programs such as Powerpoint® by Microsoft can include simply creating a white or other color bar across the top of the screen such that on the slideshows presented on the screen, the second area 11b of the display screen 11 displays the appropriate light as a light source to the lens element 15. This is generally less desirable than the operating system for various reasons such as the necessity to then not display the light bar across the top or bottom of the screen 11 in an area in the second area 11b of the display screen 11 when projecting the slides to an audience through an auxiliary projector, for instance. The software would be readily developed by an ordinarily skilled artisan to create one display for the display screen 11, while altering that display for projection onto a larger screen via an auxiliary projection device, however.

Further, while an elongated lens element 15 is generally shown, other configurations, materials or methods of redirecting light emitted form the display screen 11 onto a predetermined area (e.g., keypad 12) are within the scope of the invention.

What is claimed is:

1. A lighting system, comprising:

a lens element including:

an external light receiving surface, an internal light redirecting element, and a light emitting surface, wherein at least one of said internal light redirecting element and said light emitting surface controls light emitted from said light emitting surface to project into a predefined area at a predefined distance; and a display screen which emits light, said display screen including an first area of said screen designated to not emit light into said external light receiving surface of said lens element and a second area designated to emit light into said external light receiving surface of said lens element.

2. The lighting system according to claim 1, wherein said external light receiving surface is designed to match the surface profile of said second area of said display screen.

3. The lighting system according to claim 1, wherein said external light receiving surface includes a mask to control light entering said lens element.

4. The lighting system according to claim 1, wherein said internal light redirecting element includes a reflective surface for reflecting light internal to said lens element received from said external light receiving surface to said light emitting surface.

5. The lighting system according to claim 4, wherein said reflective surface of said light redirecting element is a concave surface.

6. The lighting system according to claim 4, wherein said reflective surface of said light redirecting element is a convex surface.

7. The lighting system according to claim 4, wherein said reflective surface of said light redirecting element is a flat surface.

8. The lighting system according to claim 6, wherein said second light guide area of said internal light redirecting element is in the form of indicia.

9. The lighting system according to claim 1, wherein said internal light redirecting element includes a light emitting surface area emitting some of said internal light.

10. The lighting system according to claim 9, wherein said light emitting surface area of said internal light redirecting element is a half-mirrored surface.

11. The lighting system according to claim 9, wherein said light emitting surface area of said internal light redirecting element is in the form of indicia.

12. The lighting system according to claim 11, wherein said indicia includes at least one of an advertisement, a name and a trademark of a legal entity.

13. The lighting system according to claim 1, wherein said internal light redirecting element includes a light guide redirecting light internal to said lens element received from said external light receiving surface to said light emitting surface.

14. The lighting system according to claim 1, wherein said internal light redirecting element includes a first light guide area for guiding some of the light internal to said lens element from said external light receiving surface to said light emitting surface and a second light guide area emitting some of said internal light substantially perpendicular to a surface of said second area of said display screen.

15. The lighting system according to claim 1, wherein said a light emitting surface includes a mask to control light emitted from said lens element.

16. The lighting system according to claim 1, further comprising a computer having a function of defining said first area of said display screen designated to not emit light into said external light receiving surface of said lens element and said second area of said display screen designated to emit light into said external light receiving surface of said lens element.

17. The lighting system according to claim 16, wherein said function of said computer includes emitting a predefined spectrum of light in said second area of said display screen.

18. The lighting system according to claim 16, wherein said function of said computer includes emitting light in said second area of said display screen having a greater intensity than light emitted In said first area of said display screen.

19. A method of illuminating a keyboard of a computer having a housing and a display screen that emits light, said method comprising mounting a lens element onto a display screen at a first area of the said screen designated to emit light into an external light receiving surface of said lens element and a second area designated to not emit light into said external light receiving surface of said lens element, said lens element further comprising an integral light redirecting element and a light emitting surface; and causing said display screen to emit light such that light entering said external light receiving surface of said lens element is internally redirected to the light emitting surface of said lens element for projection onto said keypad.

20. The method of claim 19, further comprising the step of emitting white light from the first area of the display screen.

* * * * *